(12) United States Patent
Kuroyanagi et al.

(10) Patent No.: US 10,099,661 B2
(45) Date of Patent: Oct. 16, 2018

(54) PARKING BRAKE APPARATUS

(71) Applicants: Mitsubishi Jidosha Kogyo Kabushiki Kaisha, Tokyo (JP); Mitsubishi Jidosha Engineering Kabushiki Kaisha, Okazaki-shi, Aichi (JP); Hiruta Kogyo Co., Ltd., Kasaoka-shi, Okayama (JP)

(72) Inventors: Shinji Kuroyanagi, Tokyo (JP); Shinya Kagechika, Tokyo (JP); Hiromitsu Toyota, Tokyo (JP); Koji Araki, Kasaoka (JP); Shunichi Ohtsuki, Kasaoka (JP); Yuuya Haruta, Kasaoka (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP); HIRUTA KOGYO CO., LTD., Kasaoka-Shi, Okayama (JP)

( * ) Notice: Subject to any disclaimer, the term of this patent is extended or adjusted under 35 U.S.C. 154(b) by 0 days.

(21) Appl. No.: 15/472,573

(22) Filed: Mar. 29, 2017

(65) Prior Publication Data
US 2017/0341629 A1    Nov. 30, 2017

(30) Foreign Application Priority Data
May 26, 2016    (JP) ................. 2016-105619

(51) Int. Cl.
*F16D 65/14*    (2006.01)
*B60T 1/06*     (2006.01)
(Continued)

(52) U.S. Cl.
CPC ............... *B60T 1/067* (2013.01); *B60G 5/04* (2013.01); *B60G 7/00* (2013.01); *B60T 13/741* (2013.01);
(Continued)

(58) Field of Classification Search
CPC ... B60T 1/067; B60T 7/08; B60T 7/10; F16D 65/0018; F16D 65/14; F16D 65/22; B60G 5/04
(Continued)

(56) References Cited

U.S. PATENT DOCUMENTS 2,999,696 A * 9/1961 Ringelstetter ............ B62H 1/02
                                                     188/74
4,261,449 A * 4/1981 Foster ...................... B62L 3/08
                                                  188/24.17
(Continued)

FOREIGN PATENT DOCUMENTS

JP    4565469 B2    10/2010

*Primary Examiner* — Christopher P Schwartz
(74) *Attorney, Agent, or Firm* — Birch, Stewart, Kolasch & Birch, LLP

(57) ABSTRACT

A drive unit for actuating a brake device by a driver's operation, when a vehicle is parked or stopped, is disposed independently in a trailing arm for each of right and left rear wheels. Thus, the drive unit for actuating the brake device via a wire when the vehicle is stopped or parked can be loaded, even if the space of the vehicle is tight. That is, the drive unit for actuating the brake device via the wire when the vehicle is stopped or parked can be loaded, regardless of the space of the vehicle.

7 Claims, 4 Drawing Sheets

(51) Int. Cl.

| | | |
|---|---|---|
| *B60G 5/04* | (2006.01) | |
| *B60G 7/00* | (2006.01) | |
| *B60T 13/74* | (2006.01) | |
| *F16D 65/28* | (2006.01) | |
| *F16D 121/24* | (2012.01) | |
| *F16D 125/60* | (2012.01) | |

(52) U.S. Cl.
CPC .......... *B60T 13/746* (2013.01); *F16D 65/28* (2013.01); *B60G 2200/22* (2013.01); *B60G 2204/43* (2013.01); *B60G 2206/10* (2013.01); *F16D 2121/24* (2013.01); *F16D 2125/60* (2013.01)

(58) Field of Classification Search
USPC ......... 188/2 D, 24.12, 24.19, 24.22, 26, 156, 188/171, 173
See application file for complete search history.

(56) References Cited

U.S. PATENT DOCUMENTS

| | | | | |
|---|---|---|---|---|
| 5,154,491 A * | 10/1992 | Graham | ................ | B60T 13/261 188/170 |
| 5,803,207 A * | 9/1998 | Nielsen | .................... | B62L 1/16 188/24.12 |
| 8,096,391 B2 * | 1/2012 | White | ....................... | B62L 1/10 188/24.12 |
| 2004/0112692 A1 * | 6/2004 | Plantan | .................. | B60T 13/22 188/170 |
| 2008/0135355 A1 * | 6/2008 | Jeon | ..................... | B60T 13/746 188/156 |

\* cited by examiner

PARKING BRAKE APPARATUS

The entire disclosure of Japanese Patent Application No. 2016-105619 filed on May 26, 2016 is expressly incorporated by reference herein.

TECHNICAL FIELD

This invention relates to a parking brake apparatus provided in a vehicle.

BACKGROUND ART

A parking brake apparatus is known which, when a vehicle is parked or stopped, for example, drives a single drive unit upon operation by a driver to actuate a brake device for right and left wheels simultaneously via cables tied to the right and left wheels (for example, Patent Document 1). The hitherto known parking brake apparatus operates the one drive unit and the brake device for the right and left wheels via the cables. Thus, the drive unit can be loaded in any space within the vehicle body, for example, near a spare tire storage section, and the space of the vehicle can be utilized effectively, with exposure of the drive unit to the outside of the vehicle being inhibited.

According to the technology proposed so far, the brake device for the right and left wheels are actuated by the one drive unit, so that a driving force capable of operating the two cables simultaneously is required. With the conventional parking brake apparatus, therefore, the drive unit is upsized, and the space to be loaded with the drive unit is limited. The drive unit can be easily loaded on a large vehicle with an ample space, while the drive unit is difficult to load on a small vehicle.

PRIOR ART DOCUMENTS

Patent Documents

[Patent Document 1] Japanese Patent No. 4565469

SUMMARY OF THE INVENTION

Problems to be Solved by the Invention

The present invention has been accomplished in the light of the above circumstances. It is an object of the invention to provide a parking brake apparatus which can load a drive unit for actuating a brake device via a cable when a vehicle is stopped or parked, regardless of the space of the vehicle.

Means for Solving the Problems

A parking brake apparatus according to a first aspect of the present invention, intended to attain the above-mentioned object, is a parking brake apparatus comprising: brake device for braking a wheel; a drive unit for actuating the brake device; and a cable for coupling the brake device and the drive unit and transmitting the driving force of the drive unit, which is driven based on an action command to apply the parking brake, to the brake device, wherein the drive unit is disposed in a suspension frame for each of the wheels provided on the right and left sides, and the drive unit is coupled to the brake device for each of the right and left wheels via the cables.

According to the first aspect of the present invention, the drive unit for transmitting the driving force to the brake device via the cables is arranged independently in each of the suspension frames for the right and left wheels. Thus, the drive units can be loaded, even when there is no ample space in the vehicle. Consequently, it becomes possible to load the drive units for actuating the brake device via the cables when stopping or parking the vehicle, Regardless of the space of the vehicle.

A parking brake apparatus according to a second aspect of the present invention is the parking brake apparatus according to the first aspect, wherein the suspension frame is a trailing arm, disposed between the wheel and the vehicle body side, for supporting the wheel, and the drive unit is disposed at a location of the trailing arm closer to the vehicle body side.

According to the second aspect of the present invention, the drive unit is disposed at the location of the trailing arm closer to the vehicle body side. Thus, the drive unit can be arranged at a site of the trailing arm spaced from the wheel side, the site minimally influenced by the stress of bending or torsion.

A parking brake apparatus according to a third aspect of the present invention is the parking brake apparatus according to the second aspect, wherein the right and left trailing arms are coupled by a torsion bar, and the drive unit is disposed in the trailing arm between the coupling site of the torsion bar and the vehicle body side.

According to the third aspect of the present invention, the drive unit is disposed in the trailing arm between the coupling site of the torsion bar and the vehicle body side. Thus, the drive unit can be arranged at the site where the stress of bending or torsion from the wheel side has been absorbed by the torsion bar.

A parking brake apparatus according to a fourth aspect of the present invention is the parking brake apparatus according to the second or third aspect, wherein a concave portion is formed in the trailing arm, and the drive unit is fitted into and fixed to the concave portion.

According to the fourth aspect of the present invention, the drive unit is fitted into and fixed to the concave portion of the trailing arm. Thus, the drive unit can be arranged, with the rigidity of the trailing arm being ensured, and a space where the drive unit protrudes being minimized.

A parking brake apparatus according to a fifth aspect of the present invention is the parking brake apparatus according to the fourth aspect, wherein the concave portion is formed in a side part of the trailing arm, and the cable is disposed on a side surface of the trailing arm.

According to the fifth aspect of the present invention, the drive unit is disposed in the side part of the trailing arm, and is not exposed to the road surface side. Thus, the drive unit is protected in case of a run onto a curb or the like or a scatter of small stones. Moreover, the cable is disposed on the side surface of the trailing arm. Thus, the cable can be arranged rectilinearly, and the driving power (power consumption of the drive unit) can be reduced, with the operating resistance of the cable being decreased.

If the concave portion is formed in the side part outward of the vehicle, the length of the cable can be shortened in comparison with a case where the concave portion is formed in an upper or lower part. If the concave portion is formed in the side part inward of the vehicle, foreign matter from the wheel is minimally entangled in the site where the drive unit is disposed.

The position at which the concave portion is formed can be on the lower side of the trailing arm, in a vehicle with a great height. If the concave portion is formed on the lower side of the trailing arm, it becomes difficult for snow or ice to deposit on the site where the drive unit is disposed. If the concave portion is formed on the upper side of the trailing arm, on the other hand, the drive unit is reliably protected against running onto a curb or the like or scattering of small stones, etc.

Effects of the Invention

The parking brake apparatus of the present invention can load the drive unit for actuating the brake device via the cable when the vehicle is stopped or parked, regardless of the space of the vehicle.

MODE FOR CARRYING OUT THE INVENTION

Figure 1:
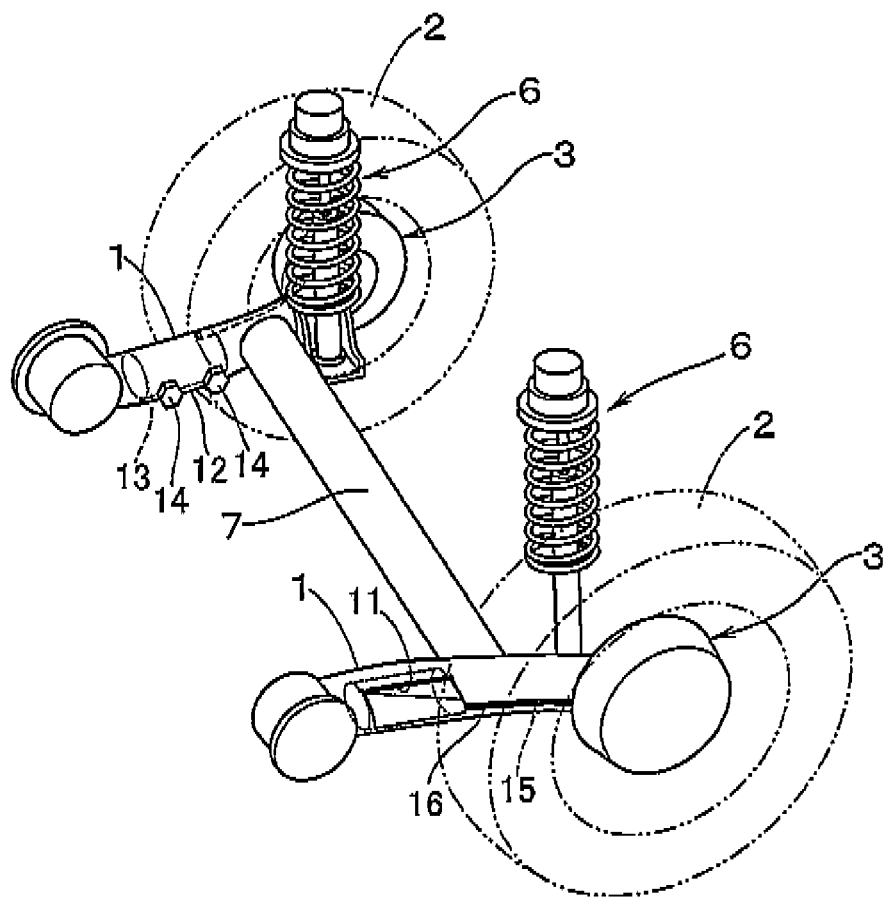
FIG. 1 is an appearance drawing of a rear suspension equipped with a parking brake apparatus according to an embodiment of the present invention.
Figure 2:
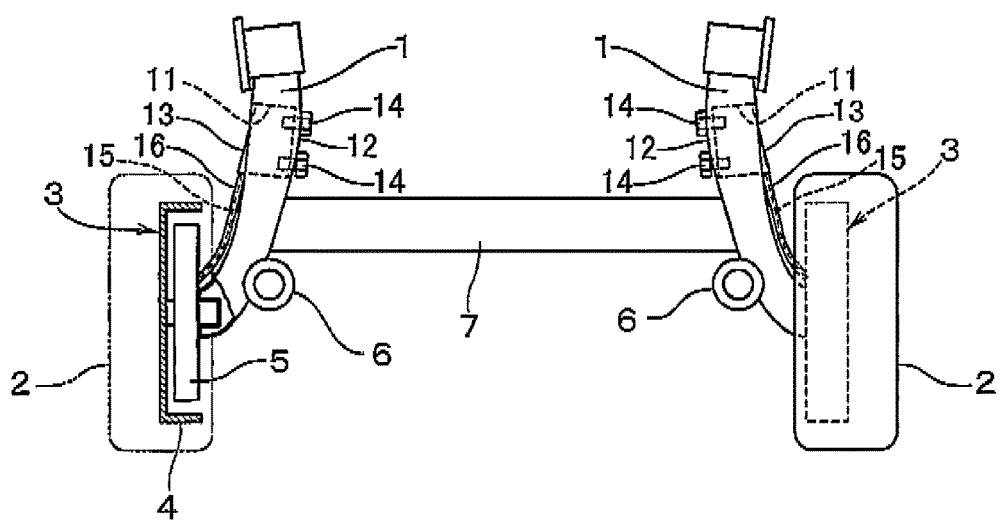
FIG. 2 is a plan view of the rear suspension equipped with the parking brake apparatus according to the embodiment of the present invention.
Figure 3:
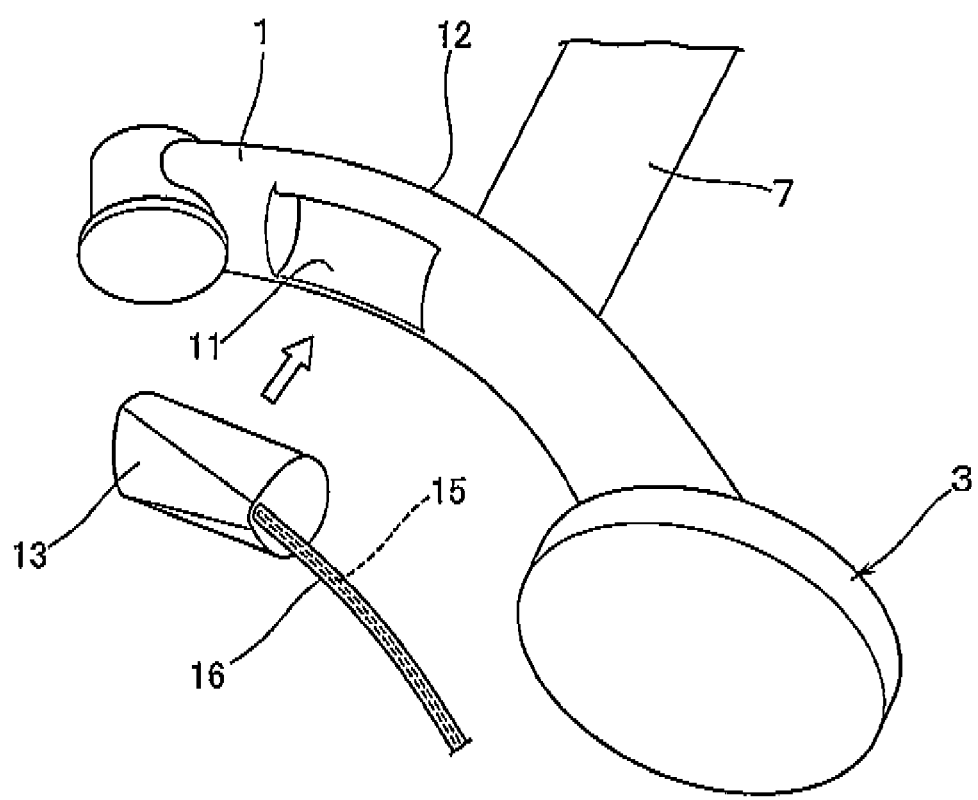
FIG. 3 is an exploded perspective view of a mounting portion for a drive unit.
Figure 4:
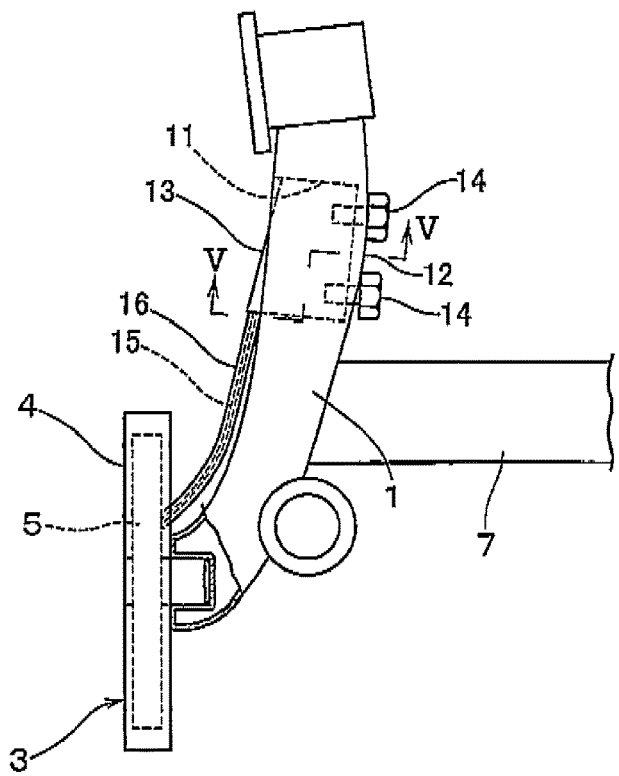
FIG. 4 is a plan view of the mounting portion for the drive unit.
Figure 5:
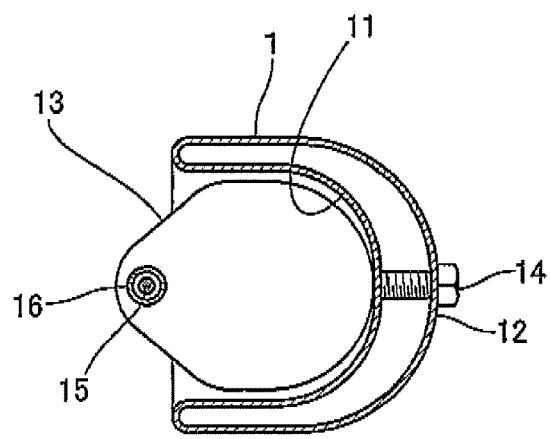
FIG. 5 is a sectional view taken on line V-V in FIG. 4.

FIG. 1 shows the appearance state of a rear suspension equipped with a parking brake apparatus according to an embodiment of the present invention. FIG. 2 shows the state, in a plan view, of the rear suspension. FIG. 3 shows the exploded perspective state of a site where a drive unit is mounted. FIG. 4 shows the state, in a plan view, of the site where the drive unit is mounted. FIG. 5 shows the state of a cross section taken on line V-v in FIG. 4.

As shown in FIGS. 1 and 2, an end of a trailing arm 1 as a suspension frame is supported on the vehicle body side, while the other end of the trailing arm 1 is mounted on a support unit 3 for supporting a rear wheel 2. As shown in FIG. 2, the support unit 3 is equipped with a drum portion 4 which is provided to be rotatable about an axle and to which the rear wheel 2 is fixed; and a brake device 5 which is provided on the axle side and presses a friction member against the drum portion 4 to lock the rotation of (to brake) the drum portion 4 (rear wheel 2).

As shown in FIGS. 1 and 2, the lower end of a damping member 6 is mounted near the other end of the trailing arm 1, and the upper end of the damping member 6 is mounted on the vehicle body side, so that inputs to the right and left rear wheels 2 from the road surface are damped. Midway parts of the right and left trailing arms 1 are coupled together by a torsion bar 7, and inputs of torsion from the right and left rear wheels 2 are absorbed thereby.

When a driver issues an action command to apply the parking brake, for example, when the driver operates a side lever or operates a foot lever, the brake device 5 mechanically works to lock the rotation of the drum portion 4 (rear wheel 2). For example, the action of a link mediated by a wire or the like presses a brake shoe to the drum portion 4 to lock the rotation of the rear wheel 2.

As shown in FIGS. 1 to 5, concave portions 11 are formed in the right and left trailing arms 1. Each concave portion 11 is formed between the coupling site, where the torsion bar 7 is coupled, and one end of the trailing arm 1, and is formed in a side part of the trailing arm 1 outward of the vehicle. An extension 12 is formed on the trailing arm 1 at the site of formation of the concave portion 11 to ensure a sectional area, thereby suppressing a decline in rigidity.

A drive unit 13 for actuating the brake device 5 is housed in the concave portion 11. As shown mainly in FIG. 4, the drive unit 13 is fixed to the trailing arm 1 via bolts 14 fitted from the central side of the vehicle.

Alternatively, the drive unit 13 is accommodated in the concave portion 11, and a metal belt is wound round it, whereby the drive unit 13 can be fixed to the trailing arm 1. It is also possible to fix the drive unit 13 to the concave portion 11 by providing brackets at the four corners of the back of the drive unit 13, and screwing the brackets to the concave portion 11, for example.

As shown mainly in FIGS. 3 and 4, the drive unit 13 is provided with an actuator, and the actuator is coupled to an operating portion (e.g., a link) of the brake device 5 via a wire 15 as a cable. The driving force of the actuator (the driving force of the drive unit 13) is transmitted to the brake device 5 via the wire 15, and the wire 15 is pulled, whereby the link, for example, acts to press the brake shoe against the drum portion 4.

The wire 15 is covered with a sheath material 16, and the ends of the sheath material 16 are fixed to the drive unit 13 and the brake device 5. Thus, an operating reaction force associated with the pull-in force of the wire 15 is borne by the sheath material 16, and is not transmitted to the trailing arm 1.

With the parking brake apparatus configured as above, if the driver operates the side lever or foot lever when the vehicle is parked or stopped, thereby issuing an action command to apply the parking brake, the actuators of the drive units 13 independently disposed in the trailing arms 1 for the right and left rear wheels 2 are actuated. Upon the actuation of the actuators, the wires 15 are pulled, and the driving force is transmitted to the brake device 5. As a result, the brake shoes are pressed against the drum portions 4 via the links, for example, whereby the rotations of the rear wheels 2 are locked.

With the above-described parking brake apparatus, the drive unit 13 for transmitting the driving force to the brake device via the wire 15 is provided individually in correspondence with each of the right and left rear wheels 2. Thus, the drive unit 13 can be downsized. Moreover, the drive unit 13 is disposed independently in the concave portion 11 of each of the right and left trailing arms 1. Thus, the drive units 13 can be loaded, if the vehicle has no ample space. Consequently, the drive unit 13 for the brake device 5 can be loaded in a vehicle of any type, ranging from a heavy duty vehicle to a compact vehicle, irrespective of the space of the vehicle.

Also, the drive unit 13 is fixed in the concave portion 11 formed in the trailing arm 1 between the site of coupling to the torsion bar 7 and the one end. Thus, the drive unit 13 is disposed in the trailing arm 1 closer to the vehicle body side. This means that the drive unit 13 can be arranged at a site of the trailing arm 1 spaced from the side of the rear wheel 2, the site minimally influenced by the stress of bending or torsion. The drive unit 13 can also be arranged at a site where the stress of bending or torsion from the side of the rear wheel 2 has been absorbed by the torsion bar 7.

Furthermore, the drive unit 13 is fitted into and fixed to the concave portion 11. Thus, the drive unit 13 can be arranged, with the rigidity of the trailing arm 1 being ensured, and the protruding space of the drive unit 13 being minimized.

Besides, the concave portion 11 is formed in the side part of the trailing arm 1. Thus, the drive unit 13 is not exposed to the road surface side, so that the drive unit 13 is protected against the vehicle running onto a curb or the like, or scattering or entanglement of small stones, etc. Moreover, the wire 15 is disposed on the side surface of the trailing arm 1. Thus, the wire 15 can be arranged rectilinearly, and the driving power (power consumption of the drive unit) can be reduced, with the operating resistance oft the wire 15 being decreased.

The position at which the concave portion 11 is formed can be on the lower side of the trailing arm 1, if the vehicle has a great height. If the concave portion 11 is formed on the lower side of the trailing arm 1, snow or ice deposits with difficulty on the site where the drive unit 13 is disposed. If the concave portion 11 is formed in a side part inward of the vehicle, foreign matter from the wheel is minimally entangled in the site where the drive unit 13 is disposed.

The parking brake apparatus of the above embodiment is configured such that the drive unit 13 for actuating the brake device by the driver's operation when the vehicle is parked or stopped is disposed independently in each of the trailing arms 1 for the right and left rear wheels 2. Thus, the drive units 13 can be loaded, even if the space of the vehicle is tight. That is, the drive unit 13 need not be upsized, and the limitations on the space for loading of the drive units 13 are reduced. Not only a large vehicle with an ample space, but also a small vehicle can be loaded with the drive units 13.

By applying the above-mentioned parking brake apparatus, therefore, the drive unit 13 for actuating the brake device 5 via the wire 15 in a stopped or parked vehicle can be loaded, regardless of the space of the vehicle.

INDUSTRIAL APPLICABILITY

The present invention can be utilized in the industrial field of parking brake apparatuses provided in vehicles.

EXPLANATIONS OF LETTERS OR NUMERALS

1 Trailing arm
2 Rear wheel
3 Support unit
4 Drum portion
5 Brake device
6 Damping member
7 Torsion bar
11 Concave portion
12 Extension
13 Drive unit
14 Bolt
15 Wire
16 Sheath material

The invention claimed is:

1. A parking brake apparatus, comprising:
a brake device which brakes a wheel;
a drive unit which actuates the brake device; and
a cable for coupling the brake device and the drive unit and transmitting a driving force of the drive unit, which is driven based on an action command to apply a parking brake, to the brake device,
wherein the drive unit is disposed in a suspension frame for each of the wheels provided on right and left sides, and
the drive unit is coupled to the brake device for each of the right and left wheels via the cables.

2. The parking brake apparatus according to claim 1, wherein
the suspension frame is a trailing arm, disposed between the wheel and a vehicle body side, for supporting the wheel, and
the drive unit is disposed at a location of the trailing arm closer to the vehicle body side.

3. The parking brake apparatus according to claim 2, wherein
the right and left trailing arms are coupled by a torsion bar, and
the drive unit is disposed in the trailing arm between a coupling site of the torsion bar and the vehicle body side.

4. The parking brake apparatus according to claim 3, wherein
a concave portion is formed in the trailing arm, and
the drive unit is fitted into and fixed to the concave portion.

5. The parking brake apparatus according to claim 4, wherein
the concave portion is formed in a side part of the trailing arm, and
the cable is disposed on a side surface of the trailing arm.

6. The parking brake apparatus according to claim 2, wherein
a concave portion is formed in the trailing arm, and
the drive unit is fitted into and fixed to the concave portion.

7. The parking brake apparatus according to claim 6, wherein
the concave portion is formed in a side part of the trailing arm, and
the cable is disposed on a side surface of the trailing arm.

* * * * *